(12) United States Patent
Shah et al.

(10) Patent No.: US 6,587,950 B1
(45) Date of Patent: Jul. 1, 2003

(54) CLUSTER POWER MANAGEMENT TECHNIQUE

(75) Inventors: Rajesh R. Shah, Portland, OR (US); Robert J. Woodruff, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,729

(22) Filed: Dec. 16, 1999

(51) Int. Cl.[7] .............................................. G06F 1/32
(52) U.S. Cl. ..................................... 713/300; 713/323
(58) Field of Search ................................ 713/300, 310, 713/320, 323, 324

(56) References Cited

U.S. PATENT DOCUMENTS

| | | | | |
|---|---|---|---|---|
| 5,638,541 A | * | 6/1997 | Sadashivaiah | 713/323 |
| 5,692,197 A | * | 11/1997 | Narad et al. | 713/323 |
| 6,079,025 A | * | 6/2000 | Fung | 713/323 |
| 6,412,068 B1 | * | 6/2002 | Nolan et al. | 713/1 |
| 2002/0004912 A1 | * | 1/2002 | Fung | 713/300 |

* cited by examiner

*Primary Examiner*—Dennis M. Butler
(74) *Attorney, Agent, or Firm*—Blakely, Sokoloff, Taylor & Zafman LLP

(57) ABSTRACT

A cluster operating in accordance with an integrating operating system independent power management with operating system directed power management includes a group of hosts connected together by a cluster interconnection fabric. A cluster administrator is connected to the group of hosts via the fabric and the cluster administrator includes a cluster power manager. A group of input/output units are connected to the group of hosts and the cluster interconnection fabric. Each of the hosts includes a controller element and an operating system power manager and input/output controller device driver stack. The cluster administrator transmits a request to the controller element of one of the hosts via the fabric and receives a reply therefrom and transmits a command. The controller element transmits the command to the operating system power manager and the input/output controller device driver stack of its host and transmits a command completion acknowledgment to the cluster power manager. The technique allows a cluster administrator to power manager fabric attached hosts and input/output controllers regardless of which host currently owns the controller.

20 Claims, 4 Drawing Sheets

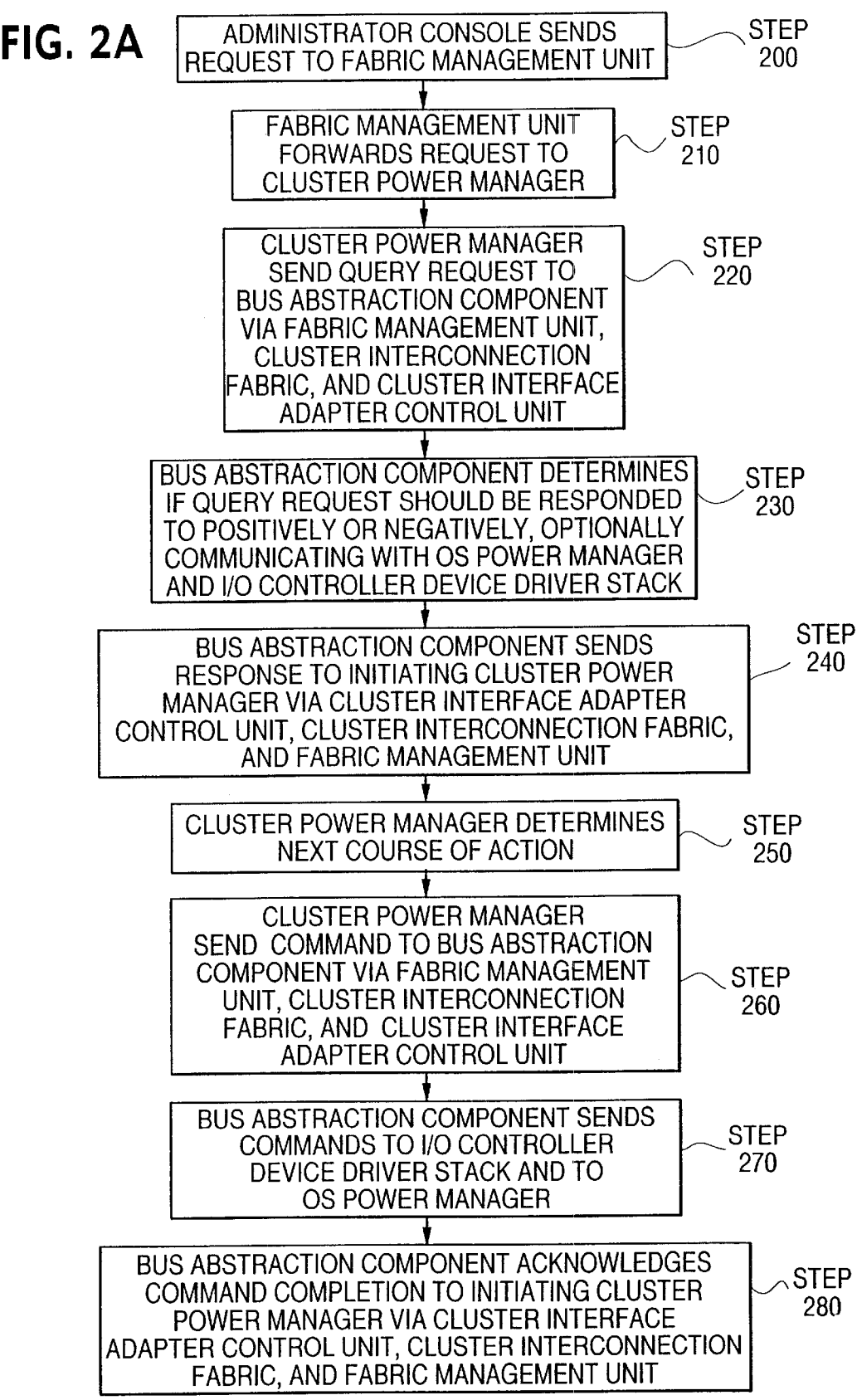

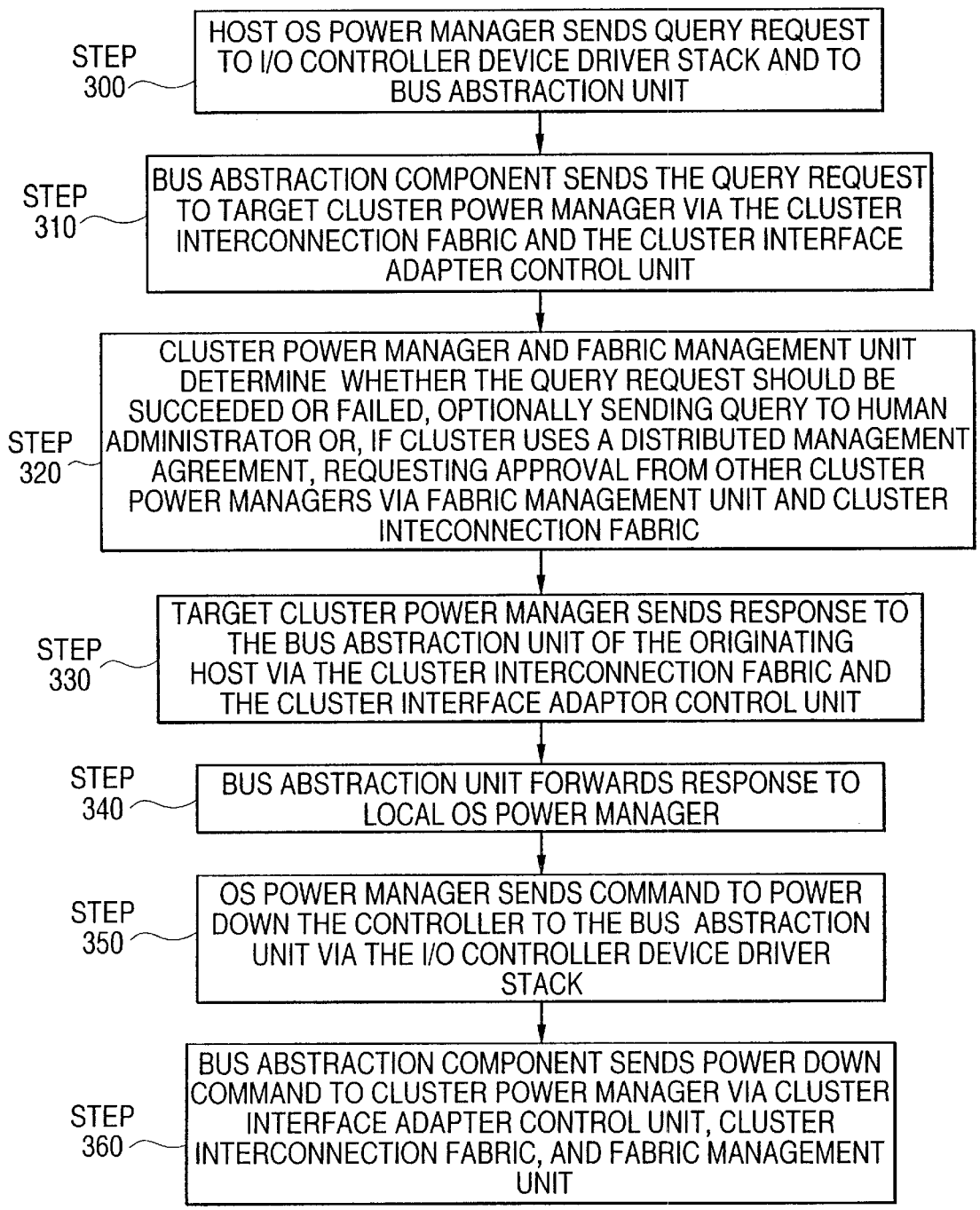

CLUSTER POWER MANAGEMENT TECHNIQUE

FIELD

The present invention relates to a power management technique for a cluster and more particularly, the present invention relates to a technique for allowing a cluster administrator to power manage fabric-attached hosts and I/O (input/output) controllers, regardless of which host currently owns the controller.

BACKGROUND

In a cluster arrangement, a plurality of servers or hosts are connected via a cluster interconnection fabric to a plurality of I/O (input/output) controllers.

A cluster administrator is connected to all of the servers and I/O controllers via the cluster interconnection fabric.

Normally, each host or server has its own OS (operating system) Power Manager which is used to control the power management of that particular host and its I/O controllers.

In addition, the cluster administrator includes a Cluster Power Manager to control the power management of all of the hosts and I/O units.

Since the OS Power Managers operate independently, and since the Cluster Power Manager of the cluster administrator operates independently, a situation may arise where there is a conflict between two or more power managers with regard to power management of a host or I/O controller.

For example, the OS Power Manager on one host or server may place its I/O controller or server in a "sleep" or "hibernate" state in the absence of any input or output for a predetermined period of time. This may create a problem when the cluster requires that I/O controller to remain in its "fully on" state to act instantaneously under a predetermined set of conditions.

Conversely, the Cluster Power Manager of the cluster administrator may signal a server or host to go into its "power down" state in a situation where that server should remain in its "fully on" state because of a particular set of circumstances.

For the reasons noted above, it is necessary to coordinate the operation of the Cluster Power Manager of the cluster administrator with the OS Power Managers of all of the hosts or servers connected together by the cluster interconnection fabric.

SUMMARY

A power management technique for a cluster having a group of hosts connected to a group of I/O (input/output) units via a cluster interconnection fabric includes: transmitting an OS (operating system) independent power management request from a Cluster Power Manager to an OS Power Manager within one of the hosts via a Control Element in the host and the fabric. A reply to the request from the Control Element is transmitted to the Cluster Power Manager via the fabric. A command to the Control Element is transmitted from the Cluster Power Manager via the fabric. The command from the Control Element is transmitted to the OS Power Manager and an I/O Controller Device Driver Stack in the host. A command completion acknowledgment is transmitted from the Control Element to the Cluster Power Manager via the fabric.

BRIEF DESCRIPTION OF THE DRAWING(S)

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 2A is an example flow illustrating an example operation of the cluster illustrated in FIG. 2.

FIG. 3A is an example flow illustrating an example operation of the cluster illustrated in FIG. 3.

DETAILED DESCRIPTION

Figure 1:
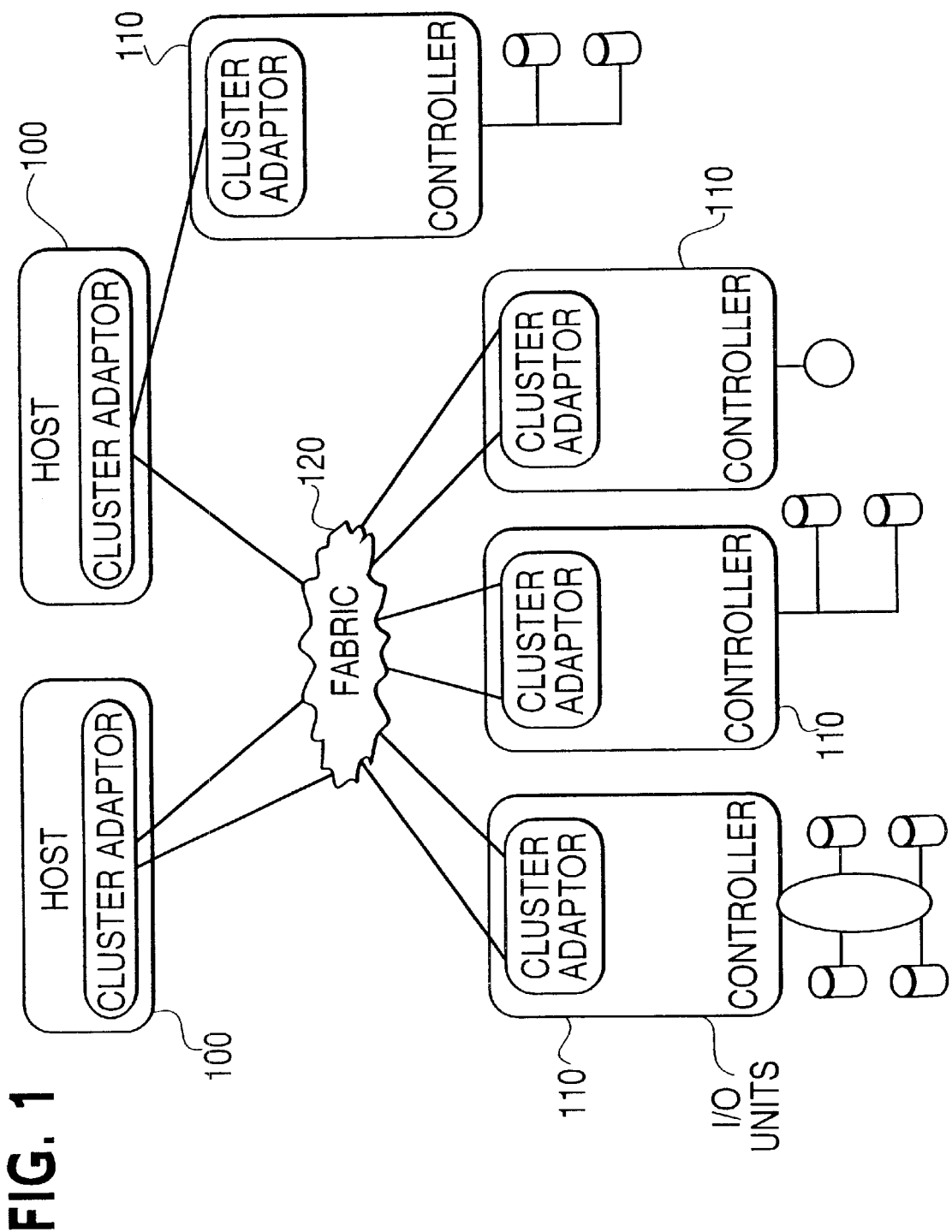
FIG. 1 illustrates an example of a cluster for use in accordance with the technique of the present invention.

Prior to describing the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. As a final note, well known power connections to ICs and other components may not be shown in the drawing figures for simplicity of illustration and discussion and so as not to obscure the invention.

As illustrated in FIG. 1, a cluster may consist of one or more hosts or servers 100 and one or more I/O controllers 110 connected together by a common interconnection fabric 120. The hosts 100 actively use one or more fabric attached I/O controllers (e.g. SCSI adapters, network adapters, etc.) to service client requests. Fabric attached I/O controllers 110 can be assigned to one or more hosts 100. Only hosts 100 that have been assigned to an I/O controller unit 110 are normally allowed to use its I/O services.

The cluster may be managed by a centralized or distributed cluster administrator. In a centrally administered cluster, a cluster administration console resides on a single fabric attached system. The administrator system contains all of the relevant information with respect to the cluster topology, I/O controller assignments, etc. In a distributed cluster management arrangement, the administrative information is distributed across all of the cluster hosts. A cluster may employ a hybrid arrangement in which administrative information is distributed among a subset of the hosts and only those hosts participate in making administrative decisions.

Regardless of how the cluster is administered, the Cluster Administrator is typically responsible for setting up and controlling the cluster, assigning I/O controllers to hosts, and monitoring the operation of all of the fabric attached components.

Another responsibility of the cluster administrator is the general power management of fabric-attached units. This is referred to as Operating System (OS) independent power management since it is initiated by a cluster administrator rather than the operating system running on a cluster host. Power management of a fabric-attached unit may include powering it off, powering it on, or powering to intermediate states that are neither completely on nor completely off, that is, "sleep" or "hibernate" states.

Operating System independent power management may be initiated by the cluster administrator for repairs, upgrades or for preventative maintenance, etc.

On the other hand, an operating system running on a host may implement its own mechanism for power managing itself and its I/O controllers. This is referred to as Operating System directed power management. With Operating System directed power management, each host is responsible for power managing only itself and the I/O controllers assigned to it.

In an Operating System directed power management arrangement, the host operating system may put an I/O controller in a low power state if there is no I/O activity directed at this controller from this host.

Typically, the host operating system will put the I/O controller in different device power states as it transitions between different system power states.

By integrating operating system independent power management techniques with operating system directed power management techniques, a more reliable and better managed cluster may be achieved.

In the present invention, the fabric management software, whether centralized or distributed, cooperates with the cluster control software on each cluster host for power management. It assumes that a Cluster Power Manager is part of the fabric management software and implements Operating System independent power management. For clusters with distributed administration, embodiments of the present invention may assume that each host participating in the administrative function includes a Cluster Power Manager. The operating system or cluster host may or may not include an operating system based Operating System Power Manager that implements an Operating System directed power management. Power management actions may be initiated by a human administrator on one or more cluster management consoles or may be initiated automatically without human intervention from any of these Power Managers.

The cluster adaptor on each host includes a control element called a Bus Abstraction Component that is responsible for managing all interaction between the Cluster Power Manager and the Operating System Power Manager. The Bus Abstraction Component acts as the glue that integrates power management initiated by the different power managers.

The two major power management responsibilities of the Bus Abstraction Components are as follows:

1. Reporting power management capabilities to the OS Power Manager: For the OS Power Manager to power-manage its fabric-attached I/O controllers, it first needs to know their power management capabilities. The Bus Abstraction Component on each host uses cluster specific commands to determine these capabilities and reports them to the OS Power Manager in a format that the Power Manager understands. For example, an operating system may define a set of Dx device power states for I/O controllers and may define a mechanism for reporting the supported power states and state transition latencies. The Bus Abstraction Component uses cluster specific knowledge to determine power management capabilities of I/O controllers assigned to that host and translates them to the equivalent Dx states.

2. Coordination between Cluster Power Manager and OS Power Manager: All power management operations are coordinated with the Bus Abstraction Component on each host that is affected by the operation. A Cluster Power Manager will typically initiate an action to power-down an I/O controller completely or to power-up a new I/O controller. An OS Power Manager may initiate an action to power-up an I/O controller, power it down or to transition it to intermediate power states if there is no I/O activity directed at that controller (i.e. controller idle detection).

Figure 2:
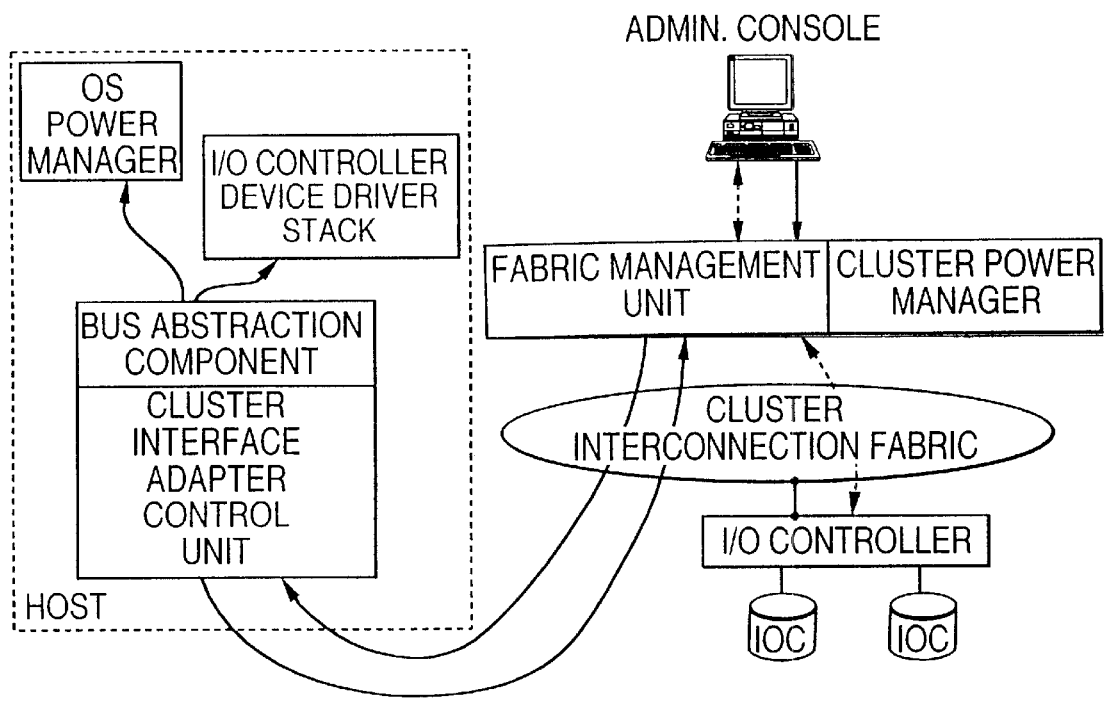
FIG. 2 illustrates an example flow of commands in the case of an I/O controller power management function initiated by a Cluster Power Manager.

FIG. 2 shows an example of the flow of messages to manage an I/O controller power-down operation initiated by a Cluster Power Manager and FIG. 2A is a flowchart corresponding thereto.

Note that if the cluster is administered using a distributed management algorithm, the various Cluster Power Managers have to coordinate among themselves when the power-down action is initiated. For example, a human operator may have issued the power-down command from a management console on one of these distributed managers. The cluster manager that received the initial command has to identify the host to which this I/O controller is assigned and may need to get approval from some or all of the other cluster managers when it initiates the power-down action.

Referring to FIG. 2, which illustrates I/O controller power management initiated by a Cluster Power Manager and FIG. 2A which is a flowchart of the operation of the system of FIG. 2, a cluster administrator sitting in front of an administrative console may decide to power manage an I/O controller. In this example, the cluster administrator decides to power down (take offline) the in-use I/O controller. This decision may be triggered by several events. An intelligent I/O controller may trigger the offline event by sending a message to the fabric management unit if it detects a problem with one of its I/O controller units. In addition, the fabric management unit may be actively monitoring the health of fabric attached controllers by periodically requesting usage and fault metrics or running diagnostics on the I/O controllers. Lastly, the cluster administrator may request a controller unit shut down as regularly scheduled maintenance.

As an example, in Step 200, the administrator requests the fabric management unit to initiate the controller unit power-down operation. This request is routed to the Cluster Power Manager in Step 210. For clusters that use a distributed management arrangement, the Cluster Power Manager may need to get approval from other Cluster Power Managers. In this example, such approval is not shown for simplicity sake.

The Cluster Power Manager determines which host has been assigned the affected controller unit and sends a query request to the Bus Abstraction Component on the affected host to check if the power down operation can be performed at this time.

As noted in Step 220, the request is sent to the Bus Abstraction Component from the Cluster Power Manager via the fabric management unit, cluster interconnection fabric, and Cluster Interface Adapter Control Unit.

In Step 230, the Bus Abstraction Component on the affected host checks to see if it is appropriate to power down the controller unit. It may fail the request if it determines that powering down the controller may force the entire system to power down (e.g., this may be a critical resource that is required for the proper functioning of this host). The Bus Abstraction Component may also seek the permission of the OS Power Manager and the I/O Controller Device Driver Stack before it succeeds the query request from the Cluster Power Manager. This is important if other system components or I/O Controller Device Driver Stacks are likely to be affected if this controller unit is powered down.

In Step 240, once the Bus Abstraction Component decides it is appropriate to power down the controller unit, it succeeds the query request to the initiating Cluster Power Manager. It also marks the controller unit as "pending removal" so new I/O requests to this controller unit from the host may be rejected. If it decides to fail the query request, it still sends a negative response to the Cluster Power Manager indicating that it is not appropriate to power down the controller unit at this time.

In Step 250, the Cluster Power Manager decides the next course of action. If the request was approved by the affected host, it sends a command message to power down the controller unit. Note that the Cluster Power Manager may decide to force the power down even if the affected host failed the request. Note that the decision by the Cluster Power Manager is not arbitrarily made but rather the Cluster Power Manager makes its decision based on a pre-ordained priority scheme which dictates when the Cluster Power Manager may force the power down even if the affected host failed the request.

In Step 260 and Step 270, the Bus Abstraction Component on the affected host receives the actual power-down command. It will cause that instance of the controller specific device drivers to be unloaded using mechanisms available on the host operating system. As part of the sequence, the Controller Device Driver may use controller specific commands to physically power down the controller unit using remote commands. The Bus Abstraction Component informs the local OS Power Manager that the controller unit has been powered down by reporting its power-state as "Off". Note that the Bus Abstraction Component is required to honor the power-down command even if it has previously failed the query request.

In Step 280, the Bus Abstraction Component on the affected host acknowledges the command completion to the initiating Cluster Power Manager. This message is an indicator that this host will not issue any more I/O requests to this controller. Once the fabric management unit receives its confirmation, it marks the controller "offline" so that any required repairs or upgrades can now be performed on the I/O controller.

Note that the sequence of events noted above is specific to a power-down operation and it is merely an illustrative example. The action taken by the Bus Abstraction Component at the host will depend on the nature of the power management request. Different types of power management requests cause different sequences of events. The common theme across all these requests is that whenever a Cluster Power Manager wants to initiate a power management request, it has to coordinate this with the bus abstraction component on each affected host. The bus abstraction component in turn will coordinate the request with the host's OS Power Manager. A similar sequence of events can be used if the Cluster Power Manager wants to power manage fabric-attached hosts instead of fabric-attached I/O controllers.

Along the same lines, when a host's OS Power Manager wants to initiate a power management operation, this must be coordinated with the Cluster Power Manager through the Bus Abstraction Component.

Figure 3:
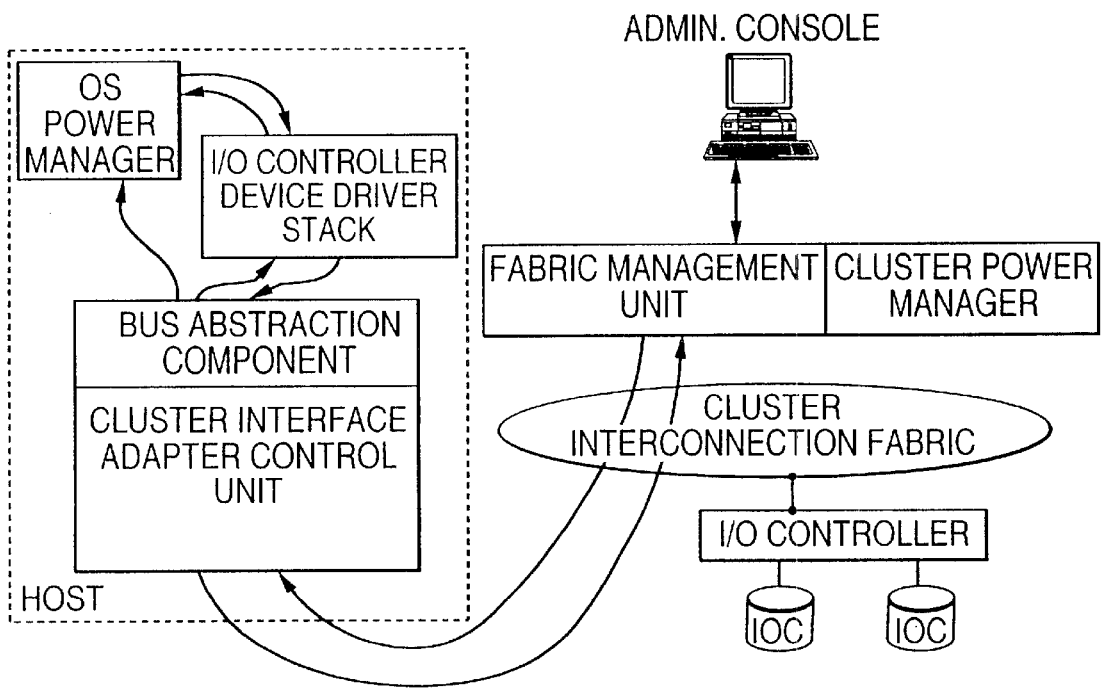
FIG. 3 illustrates an example flow of commands in the case of an I/O controller power management function initiated by an OS (operating system) Power Manager.

FIG. 3 shows an example of the flow of messages to manage a controller power-down operation initiated by the OS Power Manager and FIG. 3A is a flowchart corresponding thereto. p This example sequence of events is specific to a power-down operation and it is only an illustrative example. As before, the action taken by the Bus Abstraction Component at the host will cause different sequences of events.

The common theme across all of these requests is that whenever a host's OS Power Manager wants to initiate a power management request for a fabric-controller, this request must be coordinated with the Bus Abstraction Component. The Bus Abstraction Component in turn will coordinate the request with the Cluster Power Manager.

Referring to FIG. 3 and FIG. 3A, in step 300, a host's OS Power Manager, for example, decides to initiate a power management operation. In this example, the decision is to power-down (take off line) the in-use controller. This decision may be triggered, for example, by several events. The host system may be entering a low power state for which the appropriate controller unit power state is "Off" or an administrator on that host may want to force a controller unit power-down to repair or upgrade the controller. The host Power Manager sends a query request to the Controller Device Driver Stack and the Bus Abstraction Component to check if it is appropriate to power-down the controller at this time.

In Step 310, the Bus Abstraction Component sends the query request to the target Cluster Power Manager via the cluster interconnection fabric and the cluster interface adaptor control unit. The query request may optionally be sent through the fabric management unit.

In Step 320, the Cluster Power Manager and fabric management unit determine whether the request should be succeeded or failed. They may query a human administrator if appropriate to make the decision. If the cluster uses a distributed management arrangement, the target Cluster Power Manager may need to get approval from other Cluster Power Managers via the fabric management unit and cluster interconnection fabric.

In Step 330, the target Cluster Power Manager sends a response message back to the Bus Abstraction Unit of the originating host via the cluster interconnection fabric and the cluster interface adaptor control unit. The response may optionally be sent through the fabric management unit.

In Step 340, the Bus Abstraction Component receives the response message from the Cluster Power Manager and forwards the response (e.g. success or failure) back to the local OS Power Manager.

In Step 350, the host's OS Power Manager sends a command to power-down the controller. This command is sent to the Bus Abstraction Component via the I/O Controller Device Driver Stack. While processing this command, the I/O Controller Device Driver Stack may use controller specific commands to physically power-down the controller by sending it remote commands. The OS Power Manager may initiate this action even if it has received a failure response from the Cluster Power Manager in Step 340. Note that the OS Power Manager does not initiate action arbitrarily but rather operates in accordance with a pre-ordained priority scheme which dictates what circumstances allow it to operate even after receiving a failure response from the Cluster Power Manager.

In Step 360, when the power-down command reaches the Bus Abstraction Component, it forwards it to the Cluster Power Manager via the cluster interface adaptor control unit and cluster interconnection fabric and optionally via the fabric management unit. When the Cluster Power Manager receives this command, it marks the controller unit's current power state as "Off". The Bus Abstraction Component also informs the local OS Power Manager that the current state of the controller unit is "Off" and succeeds the power change operation initiated in Step 350.

The technique in accordance with the present invention does not attempt to manage the sharing of an I/O controller across multiple hosts. If the same I/O controller is used actively by multiple hosts, extra software must be used to manage the sharing such that conflicting I/O accesses do not occur. It is assumed that such extra share control software will coordinate the power state changes among the multiple hosts that share the I/O controller.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. For example, most, if not all of the operations of the present invention may be effected with either hardware or software programmed in a processor or a combination thereof. In addition to variations and modifications in the component parts and/or arrangements, alternative uses will also be apparent to those skilled in the art.

What is claimed is:

1. A method of power management for a cluster comprising a plurality of hosts connected to a plurality of I/O (input/output) units via a cluster interconnection fabric, the method comprising:

transmitting an OS (operating system) independent power management request from a cluster power manager to an OS power manager within one of the hosts via a control element in the host and the fabric;

transmitting a reply to the request from the control element to the cluster power manager via the fabric;

transmitting a command to the control element from the cluster power manager via the fabric;

transmitting the command from the control element to the OS power manager and an I/O controller device driver stack in the host; and transmitting a command completion acknowledgment from the control element to the cluster power manager via the fabric.

2. The method of claim 1, further comprising the controller element communicating with the OS power manager and I/O controller device driver stack prior to transmitting a reply to the request from the controller element to the cluster power manager via the fabric.

3. A cluster apparatus comprising:

a plurality of hosts connected together by a cluster interconnection fabric;

a cluster administrator connected to said plurality of hosts via said fabric, said cluster administrator comprising a cluster power manager;

a plurality of I/O (input/output) units connected to said plurality of hosts and said cluster interconnection fabric;

each of said hosts comprising a control element and an OS power manager and an I/O controller device driver stack;

wherein said cluster administrator transmits a request to said control element of one of said hosts via said fabric and receives a reply therefrom via said fabric and transmits a command and wherein said control element transmits said command to said OS power manager and said I/O controller device driver stack of its host and transmits a command completion acknowledgment to said cluster power manager via said fabric.

4. The apparatus of claim 3, wherein said control element communicates with said OS power manager and said I/O controller of its host prior to transmitting said reply to said cluster power manager.

5. The apparatus of claim 3, further comprising:

a fabric management unit disposed between said cluster power manager and said fabric for interfacing said cluster power manager with said fabric.

6. The apparatus of claim 3, further comprising:

a cluster interface adapter control unit disposed between said controller element and said fabric for interfacing said control element with said fabric.

7. The apparatus of claim 4, further comprising:

a fabric management unit disposed between said cluster power manager and said fabric for interfacing said cluster power manager with said fabric.

8. The apparatus of claim 4, further comprising:

a cluster interface adapter control unit disposed between said control element and said fabric for interfacing said control element with said fabric.

9. The apparatus of claim 5, further comprising:

a cluster interface adapter control unit disposed between said control element and said fabric for interfacing said control element with said fabric.

10. A method of power management for a cluster comprising a plurality of hosts connected to a plurality of I/O (input/output) units via a cluster interconnection fabric, the method comprising:

transmitting a query request from an OS (operating system) power manager in one of the hosts to an I/O (input/output) controller device driver stack and to a control element in said one host;

forwarding said query request from said control element to a cluster power manager via said fabric;

transmitting response to said control element from said cluster power manager via said fabric;

forwarding said response to said OS power manager from said control element;

transmitting command to said control element from said OS power manager via said I/O controller device driver stack; and transmitting command to cluster power manager from the control element via said fabric.

11. The method of claim 10, further comprising transmitting another query request to one of either an administrator or another cluster power manager from said cluster power manager prior to transmitting said response to said control element from said cluster power manager via said fabric.

12. A cluster apparatus comprising:

a plurality of hosts connected together by a cluster interconnection fabric;

a cluster administrator connected to said plurality of hosts via said fabric, said cluster administrator comprising a cluster power manager;

a plurality of I/O (input/output) units connected to said plurality of hosts and said cluster interconnection fabric;

each of said hosts comprising a control element and an OS power manager and an I/O controller device driver stack;

wherein one of said OS power managers transmits a query request to an I/O (input/output) controller device driver stack and to a control element in one of said hosts and wherein said control element forwards said query request to a cluster power Manager via said fabric which in turn transmits a response to said control element via said fabric and wherein said control element forwards said response to said OS power manager which in turn transmits a command to said control element via said I/O controller device driver stack and wherein said control element transmits a command to said cluster power manager via said fabric.

13. The apparatus of claim 12, wherein said cluster power manager transmits another query request to one of either an administrator or another cluster power manager prior to transmitting said response to said control element.

14. The apparatus of claim 13, further comprising:
a fabric management unit disposed between said cluster power manager and said fabric for interfacing said cluster power manager with said fabric.

15. The apparatus of claim 14, further comprising:
a cluster interface adapter control unit disposed between said control element and said fabric for interfacing said control element with said fabric.

16. The apparatus of claim 12, further comprising:
a fabric management unit disposed between said cluster power manager and said fabric for interfacing said cluster power manager with said fabric.

17. The apparatus of claim 16, further comprising:
a cluster interface adapter control unit disposed between said control element and said fabric for interfacing said control element with said fabric.

18. The apparatus of claim 12, further comprising:
a cluster interface adapter control unit disposed between said control element and said fabric for interfacing said control element with said fabric.

19. A computer program product comprising:
a computer usable medium having a computer readable program code means embodied in said medium for power managing a cluster comprising a plurality of hosts connected to a plurality of I/O (input/output) units via a cluster interconnection fabric, said computer program product comprising:
a computer readable program code means for causing a transmission of an O/S (operating system) independent power management request from a cluster power manager to an O/S power manager within one of the hosts via a control element in the host and the fabric;
a computer readable program code means for causing a transmission of a reply to the request from the control element to the cluster power manager via the fabric;
a computer readable coding means for causing a transmission of a command to the controller element from the cluster power manager via the fabric;
a computer readable program code means for causing a transmission of the command from the control element to the O/S power manager and an I/O controller device stack in the host; and
a computer readable program for causing a transmission of a command completion acknowledgment from the control element to the cluster power manager via the fabric.

20. A computer-readable medium that stores computer-executable instructions, the computer-executable instructions, when executed, causing a computer to:
receive an OS (operating system) independent power management request from a cluster power manager to an OS power manager within a host via a control element in the host and a cluster interconnection fabric;
transmit a reply to the request from the control element to the cluster power manager via the fabric;
receive a command from the cluster power manager to the control element via the fabric;
transmit the command from the control element to the OS power manager and an I/O controller device driver stack in the host; and
transmit a command completion acknowledgment from the control element to the cluster power manager via the fabric.

* * * * *

UNITED STATES PATENT AND TRADEMARK OFFICE
CERTIFICATE OF CORRECTION

PATENT NO.   : 6,587,950 B1  Page 1 of 1
DATED        : July 1, 2003
INVENTOR(S)  : Shah et al.

It is certified that error appears in the above-identified patent and that said Letters Patent is hereby corrected as shown below:

<u>Column 5,</u>
Line 66, before "This example", delete "p".

Signed and Sealed this

Twenty-fifth Day of November, 2003

JAMES E. ROGAN
*Director of the United States Patent and Trademark Office*